Sept. 6, 1960 C. C. MARZIN ET AL 2,951,907

ELECTRONIC CONCENTRATOR

Filed Feb. 27, 1957 6 Sheets-Sheet 1

INVENTORS
CHARLES C. MARZIN
MARC A. CHAPPEY
PIERRE M. LUCAS

BY Pennie Edmonds Morton Barrows & Taylor

ATTORNEYS

Sept. 6, 1960 C. C. MARZIN ET AL 2,951,907

ELECTRONIC CONCENTRATOR

Filed Feb. 27, 1957 6 Sheets-Sheet 2

INVENTORS
CHARLES C. MARZIN
MARC A. CHAPPEY
PIERRE M. LUCAS

BY Pennie Edmonds Morton Barrows & Taylor

ATTORNEYS

INVENTORS
CHARLES C. MARZIN
MARC A. CHAPPEY
PIERRE M. LUCAS
BY
Pierre Edwards, Morton, Barrows & Taylor
ATTORNEYS Sept. 6, 1960 C. C. MARZIN ET AL 2,951,907

ELECTRONIC CONCENTRATOR

Filed Feb. 27, 1957 6 Sheets-Sheet 4

INVENTORS
CHARLES C. MARZIN
MARC A. CHAPPEY
PIERRE M. LUCAS
BY
Pennie Edmonds Morton Barrows & Taylor
ATTORNEYS Sept. 6, 1960 C. C. MARZIN ET AL 2,951,907

ELECTRONIC CONCENTRATOR

Filed Feb. 27, 1957 6 Sheets-Sheet 5

INVENTORS
CHARLES C. MARZIN
MARC A. CHAPPEY
PIERRE M. LUCAS
BY
Pennie Edmonds Morton Barrows + Taylor
ATTORNEYS Sept. 6, 1960 C. C. MARZIN ET AL 2,951,907

ELECTRONIC CONCENTRATOR

Filed Feb. 27, 1957

6 Sheets-Sheet 6

INVENTORS
CHARLES C. MARZIN
MARC A. CHAPPEY
PIERRE M. LUCAS

BY

Pennie Edmonds Morton Barrows + Taylor

ATTORNEYS

United States Patent Office 2,951,907

Patented Sept. 6, 1960

2,951,907

ELECTRONIC CONCENTRATOR

Charles C. Marzin, 23 Rue Guynemer, Issy-les-Moulineaux, Marc A. Chappey, 12 Boulevard Jean Mermoz, Neuilly-sur-Seine, and Pierre M. Lucas, 11 Rue Abbe Derry, Issy-les-Moulineaux, France Filed Feb. 27, 1957, Ser. No. 642,699

Claims priority, application France Feb. 29, 1956

5 Claims. (Cl. 179—18)

The present invention relates to telephony and more particularly to an electronic concentrator which makes it possible to connect a plurality of subscribers to a single telephone exchange with the help of a number of trunks less than the number of subscribers.

In certain telephone systems, for example in rural telephone systems, it is necessary to serve the subscribers by means of an exchnge which is remote from the subscribers' locations. In these systems, the subscribers' stations are first connected by short lines to a concentration unit or satellite which in turn, is connected to the exchange by means of a smaller number of common trunks and a minimum of control leads to pass information from the satellite to the central office as to the condition of the subscriber's lines and control signals from the central office for controlling the establishment of the talking connections in the satellite office. In order to have the greatest saving in the telephone plant it is desirable to have only trunk lines and no control leads between the remote satellite and the central office.

It is an object of the invention to provide a concentrator of an exclusively electronic nature.

A further object of the invention is the provision of a concentrator which can be used at either end of lines not carrying the direct current such as modulated carrier wave lines.

It is another object of the invention to provide a concentrator not requiring on the subscribers-end thereof any power source, the subscribers-end concentrator being instead fed remotely from the exchange-end concentrator. It is another object of the invention to have no control leads between the remote satellite and the central office.

It is still another object of the invention to minimize the number of frequencies required for the various switching signals. Hereinafter the term "concentrator" will be applied to the combination of two devices or sets of apparatus, one disposed at the junction of the individual subscriber's lines and called the subscribers-end concentrator, and the other disposed at or near the control exchange and called the exchange-end concentrator.

The various subscribers are connected to the subscribers-end concentrator by means of individual lines and this concentrator is connected to the exchange-end concentrator by means of a small number of trunks. On the other hand, the exchange-end concentrator is connected to the exchange itself by means of as many lines as there are subscribers.

The principle of the concentrator of the invention is as follows:

Each subscriber is identified by means of a coded identification signal comprising a plurality of frequencies within a group of specified frequencies. For example, if there are ten subscribers, each such signal may comprise two frequencies taken from a group of five. The identification signal for a subscriber can be generated either by the subscribers-end concentrator when a calling subscriber lifts his handset, or by the exchange-end concentrator when the subscriber's line is called. Each trunk is identified by a signal which may be referred to as a trunk identifying signal and which is characterized by a particular frequency which is different from any of the subscribers' identification frequencies. The trunk identification signal of a particular trunk is generated by the exchange-end concentrator when the latter receives the identification signal of a subscriber calling or to be called and when said trunk is available.

Arrival at the exchange-end concentrator of a subscriber's identification signal effects a change in the conduction phase of a bi-stable trigger circuit associated with a free trunk, this device being referred to as a trunk identifying trigger circuit. Arrival of the subscriber's identification signal further effects, after decoding thereof, shift in the conduction phase of a two-state trunk access controlling trigger circuit which when so shifted connects said trunk with the input to the exchanger.

In the subscriber's side concentrator, simultaneous presence of a given subscriber's identification signal and of the trunk identification signal shifts the phase of a first two-state trigger circuit for trunk selection and also the phase of a second or "trunk-access" two-state trigger circuit which, when shifted, connects the trunk which has been selected.

The subscriber is thus connected to the exchange. He then performs the dialing operation. This applies to the selected trunk a signal having a particular frequency, divided into dialing pulses. To distinguish these from the other pulses utilized in the system they will hereinafter be referred to as trains of frequencies. These trains of frequencies may possess the duration of dial pulses in normal telephone switching systems.

Restoration of the system to rest is effected by means of a signal of special frequency.

With the apparatus thus far described, there are required, for a system including ten subscribers and two trunks, only nine frequencies. In fact, it is possible to get along with eight frequencies since, as presently will be described, the trunk identification signals may be of the same frequency.

The invention will now be described in further detail with reference to the accompanying drawings in which Fig. 1 is a diagram of a subscribers-end concentrator according to the invention;

Figure 1:
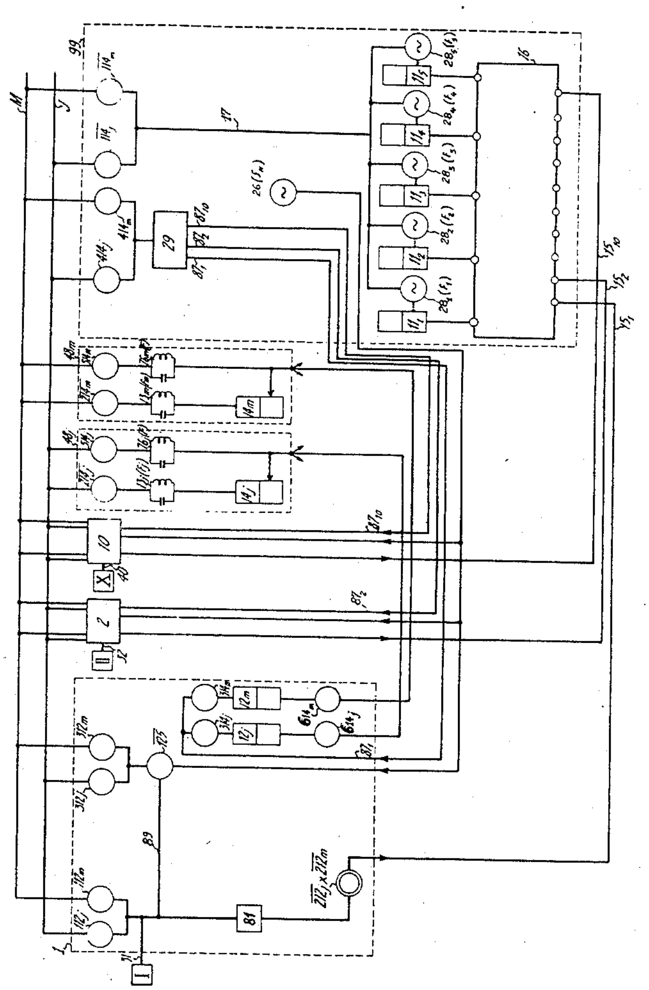

In these drawings, a bi-stable trigger circuit is indicated by means of a rectangle divided in two by means of a full horizontal line. The reference character for the trigger circuit is shown in one or another of the two halves of the rectangle, according to the following convention: The half of the rectangle to which the reference character is applied represents that one of the two bi-stable states of the circuit which is changed when a signal is applied to the input connection terminating at that half of the rectangle. The equilibrium state identified by the location of the reference character is restored by applying a signal to the other rectangle half. The equilibrium state identified by the location of the reference character in accordance with this convention is that for the apparatus when at rest.

A monostable trigger circuit is identified in the drawing by means of a rectangle having a dashed horizontal line drawn therethrough. A gate circuit is identified by means of a circle. One or more gate circuits may be associated with a trigger circuit and such gate circuits are identified by reference characters which differ by a multiple of 100 from the reference character of the trigger circuit with which they are associated. Moreover, gate circuits which are open for the "rest" position of their associated trigger circuits are identified by barred reference characters, whereas gate circuits closed for this condition are identified by reference characters not barred. For example, the trigger circuit **14*j* controls the gate circuits $\overline{114j}$ and 414*j*, the first being open when the circuit 14*j* is in rest position and the second being closed. Obviously, the condition of these gates is reversed when the device 14*j*** is reversed in phase, which condition may be referred to as the energized or operated position thereof.

Certain gate circuits are controlled by two trigger circuits so as to be open only upon simultaneous existence of the two trigger circuits in a specified phase condition. These will be identified by a product symbol such as $\overline{212j}\times\overline{212m}$. This signifies that the gate circuit is open when trigger circuits **12*j* and 12*m*** are both in their rest position. Such gate circuits are shown in the drawings by means of two concentric circles.

In the example to be given, let it be supposed that ten subscribers are connected to the subscribers-end concentrator and that consequently the exchange-end concentrator is connected to the exchange itself by ten lines. Further let it be assumed that the two halves of the concentrator are coupled together by two trunks J and M.

Referring to Fig. 1 which illustrates the subscribers-end concentrator, ten telephone sets, I, II . . . X are connected through subscriber's lines 31, 32 . . . 40 respectively to subscriber's station end equipments 1, 2 . . . 10, in the subscribers-end concentrator. The equipments 1, 2 . . . 10 are connected each to two trunks J and M. The trunks J and M include respectively trunk apparatus denoted **48*j* and 48*m*, and they possess in common the device 99. A detailed description will now be given of one of the subscriber's line equipments 1–10, of one of the trunk apparatus 48*j* and 48*m*, and of the common device 99**.

The subscriber's equipment 1 includes two trunk access trigger circuits **12*j* and 12*m*, which respectively control gate circuits 112*j* and 112*m* for connection of the subscriber's telephone set I either to the trunk J or to the trunk M. Input to trigger circuits 12*j* and 12*m* is effected through a decoder 29 which is located in the common device 99, through a connection $87_1$, and through gate circuits 314*j* and 314*m* which are controlled by the trunk devices 48*j* and 48*m* (specifically by trigger circuits 14*j* and 14*m* therein). One of these trunk access trigger circuits, for example 12*j***, is caused to shift in phase from the quiescent to the energized condition when the subscribers-end concentrator receives simultaneously a subscriber's identification signal having frequencies characteristic of the specified subscriber and a trunk identification signal of the frequency $f_j$.

The subscriber's equipment 1 further comprises a differentiating circuit 81 which, when the handset is lifted at subscriber's station I, sends a negative pulse to the input of a coding circuit 16 through a gate circuit $\overline{212j}\times\overline{212m}$ and through a line $15_1$.

The subscriber's equipment 1 further includes a gate circuit $\overline{125}$ controlled by the current passing through the subscriber's line. Consequently, this gate is open when the subscriber's handset is hung up, and also in the intervals between dialing pulses. It is closed when the handset is lifted and during the dialing pulses. This gate circuit $\overline{125}$ is connected on one side to the trunks J and M through the gate circuits **312*j* and 312*m* respectively, and on the other side to a generator 26 which develops a signal of frequency $f_N$ and which is located in the common device 99. During dialing, each opening of the supply circuit for the telephone set I effects opening of the gate circuit $\overline{125}$ and hence transmission to the selected trunk of frequency pulses through that one of the gate circuit 312*j* and 312*m*** which is open.

The trunk equipment **48*j* comprises a trigger circuit 14*j*** for trunk selection which is responsive to a trunk identifying frequency $f_j$ and (in the opposite sense) to a cancellation signal of frequency F.

The common device 99 includes a coding circuit 16 having ten inputs connected in pairs to five outputs leading to monostable trigger circuits $11_1$ to $11_5$. These monostable trigger circuits operate directly, when shifted to their unstable phase, to energize generators $28_1$ to $28_5$ respectively operating on frequencies $f_1$ to $f_5$. The outputs of all of these generators are connected to a common lead 17 which in turn is connected to the trunks J and M through gate circuits $\overline{114j}$ and $\overline{114m}$ respectively.

The coding circuit 16 has the function of deriving from an input pulse, arriving for example on the input line $15_1$, two pulses effective simultaneously to trip two monostable trigger circuits such as $11_1$ and $11_2$ for example. Thus, lifting of the hand set for subscriber I generates an identification pulse containing the frequencies $f_1$ and $f_2$. Coding circuits capable of performing these functions are known and will not be described here in detail.

The common device 99 further includes a decoding circuit 29 connected to the trunks J and M through gate circuits **414*j* and 414*m* respectively. The decoder 29 has ten outputs connected respectively through leads $87_1$ to $87_{10}$, one for each of the subscriber's devices 1–10. In each, the corresponding one of leads $87_1$–$87_{10}$ is connected to trigger circuits 12*j* and 12*m* via gate circuits 314*j* and 314*m***.

Lastly, the common device 99 includes a generator 26 which develops the dialing signal of frequency $f_N$. As above stated, this generator is connected in each of the subscriber's devices 1–10, to a gate circuit such as $\overline{125}$ in subscriber's apparatus 1.

Figure 2:
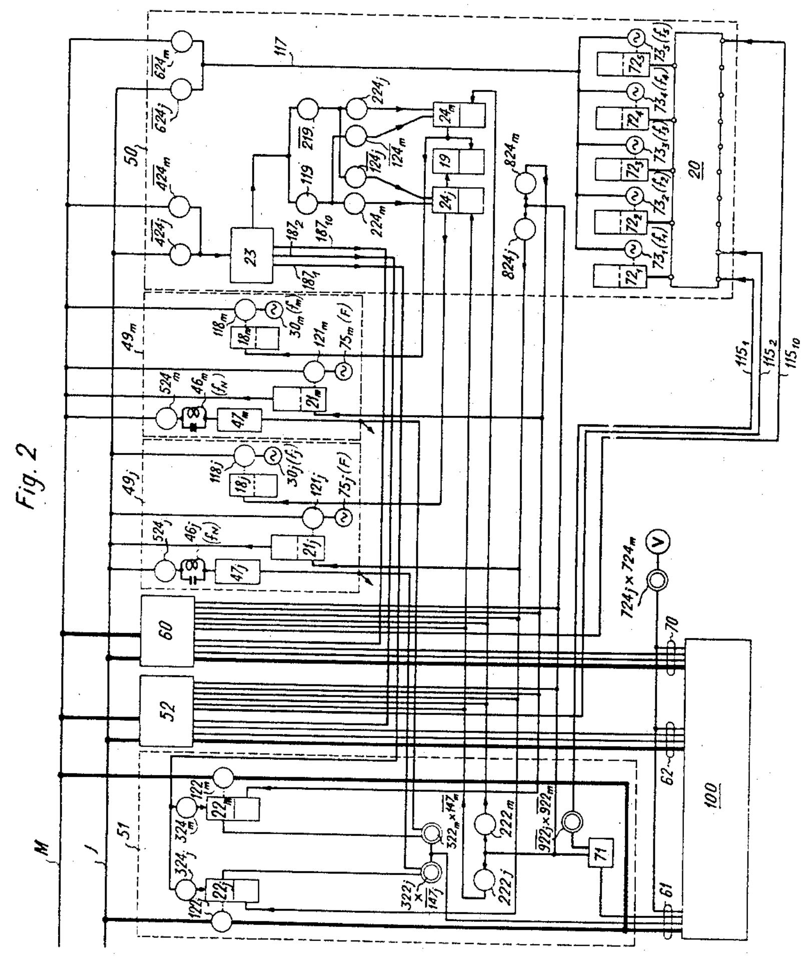
Fig. 2 is a diagram of an exchange-end concentrator according to the invention.

Referring now to Fig. 2, the exchange-end concentrator includes individual subscriber's devices 51–60, the trunk devices **49*j* and 49*m*, and an element 50 common to trunks J and M. Of devices 51–60, which may be identical, a single one 51 will be described in detail, and similarly only one, namely 49*j*, will be described of the two devices 49*j* and 49*m***.

The exchange 100 is connected via lines 61–70 with subscriber's devices 51–60 respectively. Lines 61–70 have been shown in four conductor form. The talking circuit is shown as a single bold line, the other three conductors representing those for calling and dialing, for testing and for indication of the busy condition.

The subscriber's device 51 includes two trunk access trigger circuits **22*j* and 22*m*, analogous to circuits 12*j* and 12*m* of Fig. 1. Circuits 22*j* and 22*m* respectively control gate circuits 122*j* and 122*m* (analogous to circuits 112*j* and 112*m* of Fig. 1) which, when open, serve to connect line 61** either to the trunk J or to the trunk M.

Both trunk access trigger circuits **22*j* and 22*m* of each of the various subscriber's devices 51–60 are coupled through leads $187_1$–$187_{10}$ for devices 51–60 respectively to a decoder 23 which may be identical with the decoder 29. This decoder 23 is in turn connected to trunks J and M respectively through gate circuits $\overline{424j}$ and $\overline{424m}$. The decoder and these gate circuits are disposed within the common element 50. A trunk access trigger circuit such as 22*j* is tripped when the exchange-end concentrator has selected by means of element 50** a specified trunk as J or M and when further it receives the identification signal of the subscriber desired. The trunk access trigger circuit has the further function of retransmitting to the exchange the loop circuit of a subscriber once he has been connected and has lifted his hand set.

The trunk device **49*j* comprises a first monostable trigger circuit 18j which, under control of the trunk identifying circuit 24j in the common element 50, controls transmission of the trunk identification signal of frequency $f_j$. It also includes a second monostable circuit 21j provided for transmission of a cancellation signal of frequency F, and a detector-amplifier 47j** provided to repeat the dialing signals.

The common element 50 receives all of the subscribers' identification signals whether they come from the exchange-end or from the subscribers-end concentrators. It selects a trunk which is free. It includes essentially two trunk selecting trigger circuits 24j and 24m (analogous to circuits 14j and 14m of Fig. 1) and a priority trigger circuit 19 which trips each time one of circuits 24j and 24m is tripped. Circuit 19 indicates, for each new subscriber's identification signal (upon arrival thereof), the trunk not having served the preceding switching function, to the extent that such trunk is free. Element 50 further comprises a coding circuit 20 which may be identical to the coder 16 of Fig. 1. The ten inputs to coder 20 are connected to test lines $115_1$–$115_{10}$ of the lines 61–70 through differentiating circuits of which one is indicated at 71 for line 61, in subscriber's device 51, and through gate circuits such as $\overline{922j}\times\overline{922m}$. These are analogous to gates $\overline{212j}\times\overline{212m}$ of Fig. 1. The five outputs of the coder 20 are connected to monstable trigger circuits $72_1$–$72_5$ respectively. These control directly generators $73_1$ and $73_5$ respectively which produce signals of the same frequencies $f_1$ to $f_5$ as the generators $28_1$ to $28_5$ in the subscribers-end concentrator. These generators are connected via lead 117 to gate circuits $\overline{624j}$ and $\overline{624m}$ which perform the same function as gate circuits $\overline{114j}$ and $\overline{114m}$ of Fig. 1.

The operation of the concentrator is as follows:

*Subscriber's station I calling—connection of a calling subscriber to the exchange*

When subscriber I lifts his hand set, to initiate a call, a negative pulse is sent (Fig. 1) through gate circuit $\overline{212j}\times\overline{212m}$ and the connection $15_1$ to the coding circuit 16. Supposing neither of the trunks J and M to be busy, in consequence of which both of the gate circuits $\overline{114j}$ and $\overline{114m}$ are open, an identification signal including frequencies $f_1$ and $f_2$ will be sent toward the exchange through both of these open gate circuits and over both of trunks J and M.

In the exchange-end concentrator (Fig. 2), this identification signal passes through the open gate circuits $\overline{424j}$ and $\overline{424m}$, through the common output 23' of the decoder 23 to that one of the gate circuits 119 and $\overline{219}$ which is open according to the phase condition of the priority trigger circuit 19. Supposing circuit $\overline{219}$ to be open the signal then passes through gate circuit $\overline{124j}$, and to the trigger circuit 24j for selection of a trunk. Triggering of circuit 24j results in assignment of trunk J to the calling party. If the gate circuit 119 had been open, the identification signal would have passed through this gate, through the open gate $\overline{124m}$ and to the trunk selecting trigger circuit 24m. Triggering of circuit 24m would have assigned to the calling subscriber the trunk M.

Let it be supposed that it is circuit 24j which has been triggered. 24j upon being triggered, triggers the monostable circuit 18j. This opens gate circuit 118j in consequence of which there is applied to trunk J a trunk identification signal of frequency $f_j$ produced by the generator 30j. It is generally possible, however, to control directly the frequency generator by means of a monostable trigger circuit without passing through a gate circuit.

In the subscribers-end concentrator, this trunk designating signal $f_j$ passes through gate circuit $\overline{214j}$ (Fig. 1) and filter 13j tuned to frequency $f_j$ to trigger the trunk designating trigger circuit 14j. When circuit 14j is triggered, it opens the gate circuits 314j and 414j. The subscriber's identification signal of frequencies $f_1$ and $f_2$ passes through gate circuit 414j to decoder 29. The decoded signal then passes through $87_1$, and through gate circuit 314j to operate the trunk access trigger circuit 12j. Circuit 12m is not triggered inasmuch as gates 314m and 414m remain closed.

Triggering of circuit 12j opens gate 112j and consequently connects the subscriber's station I to the trunk J. From this moment the subscriber's station is connected to the specified or designated trunk J.

On the exchange side, the calling subscriber's identification signal of frequencies $f_1$ and $f_2$ as decoded in decoder 23 passes not only toward gates 119 and $\overline{219}$ but also over line $187_1$ to the gate 324j, which is opened as soon as the trunk designating trigger circuit 24j is triggered. The decoded signal consequently passes to circuit 22j and operates it. Gate 122j is thereupon opened and trunk J is consequently connected to the exchange 100. From this moment the calling station I is connected through the designated trunk J to the exchange 100.

*Dial tone and dialing*

When the calling line is seized by a free recorder, a dial tone is transmitted to the calling station. Upon receipt of this signal the subscriber begins dialing. Each opening of the supply voltage at his station I produced by the dialing operations opens gate $\overline{125}$ and consequently transmits to the trunk J through open gate 312j a dialing pulse comprising a train of oscillations of frequency $f_N$. It will be recalled that with respect to their duration, these trains may be the same as the D.C. pulses employed in the dialing systems of the prior art. It may be noted that to avoid inadvertent energizations of the dialing circuit in response to speech, the frequency $f_N$ may be chosen outside the range of voice frequencies transmitted.

In the exchange-end concentrator these pulses pass through the open gate 524j, through the filter 46j tuned to frequency $f_N$, and to the amplifier detector 47j which retransmits to the exchange the dial pulses, as will be presently described.

The exchange hunts the called station, and when the line thereof is found it sends to the calling subscriber either the busy signal or a signal to indicate that a circuit has been completed through to the called station.

These signals do not operate on any element of the concentrator since the circuit from the calling subscriber to the exchange was completed, as above indicated, before the dialing operation began.

*The case where one of the trunks is occupied by a conversation in progress*

Let the trunk J be assumed to be in use by a subscriber other than the calling subscriber I. The trunk is therefore characterized by the fact that its trunk designating circuits 14j and 24j are in energized condition. When the subscriber I lifts his hand set the identification signal of frequencies $f_1$ and $f_2$ which is then generated finds gate $\overline{114j}$ closed in view of the busy condition of trunk J. It therefore passes through the open gate $\overline{114m}$ to the trunk M. In the exchange-end concentrator this signal passes through the open gate $\overline{424m}$, and, after decoding, through open gates 119 and $\overline{124m}$. Passing through gate $\overline{124m}$ it triggers circuit 24m for assignment to the subscriber of the second trunk M. Triggering of circuit 24m triggers monostable circuit 18m. There is consequently applied to trunk M a signal of frequency $f_m$, designating the trunk M.

It may be noted here that since the paths followed by the line trunk designating signals are entirely separate, the frequency $f_m$ may be the same as the frequency $f_j$.

With application to trunk M of the frequency $f_m$ the succeeding steps are as previously described, with trunk M substituted for trunk J. There occurs successively (Fig. 1) triggering of circuit 14_m_ which is responsive to frequency $f_m$, triggering of circuit 12_m_ in response to the frequencies of $f_1$ and $f_2$, and opening of the gate 112_m_ which connects the subscriber I to trunk M. Also, in the exchange-end concentrator, triggering of circuit 22_m_ responsive to the combination of frequencies $f_1$ and $f_2$, opening of the gate 122_m_ which connects trunk M to line 61, and completion of the loop circuit at the exchange via circuit 22_m_. Then comes transmission of a dial tone by the exchange and dialing and retransmission of the dialing signals by the amplifier-detector 47_m_.

*Case where both trunks are simultaneously busy*

In this event the circuits 14_j_, 14_m_, 24_j_, and 24_m_ are all simultaneously energized. In the subscribers-end concentrator, both of gates $\overline{\mathbf{114}j}$ and $\overline{\mathbf{114}m}$ are closed, preventing access of the calling subscriber I to either of trunks J or M. The calling subscriber is notified of this condition by the absence of a dial tone. In the exchange-end concentrator, the gate 724_j_×724m is open and a busy signal V is applied to the busy conductors of the outgoing lines 61–70, energizing all of the busy signal relays.

*Subscriber station I called*

Let it be supposed that the exchange is calling subscriber I. Selection by the exchange of outgoing line 61 applies a suitable potential such as ground to the test conductor of this line. This produces a pulse at the output of differentiating circuit 71 and this pulse is applied to the coder 20 through the gate $\overline{\mathbf{922}j}\times\overline{\mathbf{922}m}$.

The coder 20, like the coder 16, sends a signal of frequencies $f_1$ and $f_2$ through one or both of gates $\overline{\mathbf{624}j}$ or $\overline{\mathbf{624}m}$, provided one or both thereof is open. This signal follows in the exchange-end concentrator the same path as if it came from the station of subscriber I as the calling party. The common element 50 effects designation of a trunk, such as trunk J. The trunk designating frequency $f_j$ is applied to the designated trunk J superposed on the identification signal. The subscribers' device 51 then opens the gate 122_j_ exactly as in the case where subscriber I is the calling party. It will be seen, however, that no coupling loop is completed in the exchange 100 by the circuit 22_j_.

In the subscribers-end concentrator, the simultaneous arrival of the identification signal of frequencies $f_1$ and $f_2$ and of the trunk designation signal of frequency $f_j$ triggers circuit 14_j_ and then circuit 12_j_ and then the opening of gate 112_j_. Subscriber's station I is thus connected with the exchange.

Triggering of circuit 12_j_ also opened gate 312_j_ causing application to trunk J of the dialing frequency $f_N$ since station I is hung up. Consequently, as will be presently seen in further detail, an output signal is derived from circuit 47_j_ (Fig. 2), just as if there were dialing, and hence the loop circuit is not completed at the exchange until I lifts his hand set.

Lifting of that hand set closes gate $\overline{\mathbf{125}}$ and hence stops application of the dial frequency $f_N$, to the designated trunk. The loop circuit is then completed at the exchange.

*Restoration to quiescent condition*

At the conclusion of a conversation transmitted over trunk J, circuits 12_j_ and 14_j_ in the subscribers-end concentrator and 22_j_ and 24_j_ in the exchange-end concentrator are all in energized condition.

Upon hanging up by the subscriber, i.e. by I, gate $\overline{\mathbf{125}}$ is opened again and the dialing frequency is again transmitted toward the exchange. This signal is continued for a suitable time, for example at least 66 milliseconds, causing restoration in the exchange of the subscriber's circuit interrupting relay. The voltage on the test conductor of the line 61 changes and a pulse from differentiator 71 (opposite in polarity to that which had operated coder 20) restores circuit 22_j_ to rest condition. This is effected through gate 824_j_ upon restoration of circuit 24_j_ via gate 222_j_ which is still open. The pulse passing through gate 824_j_ also triggers monostable circuit 21_j_. A restoration signal of frequency F is thereupon applied by generator 75_j_ to trunk J through gate 121_j_.

In the subscribers-end concentrator the signal F so applied passes from trunk J through gate 614_j_, which is open, and through filter 76_j_, to restore to rest condition the trunk designating trigger circuit 14_j_ and, through gate circuit 514_j_ to restore to rest condition the trunk access trigger circuit 12_j_.

In the foregoing it has been assumed that lifting by subscriber I of his hand set applied a pulse to lead $\mathbf{15}_1$ toward coder 16 and also closed gate $\overline{\mathbf{125}}$. It has moreover been assumed that circuit 22_j_ closed the loop for line 61 and that circuit 47_j_ opened this loop. These functions will be described by reference to Figs. 3 and 4.

Figure 3:
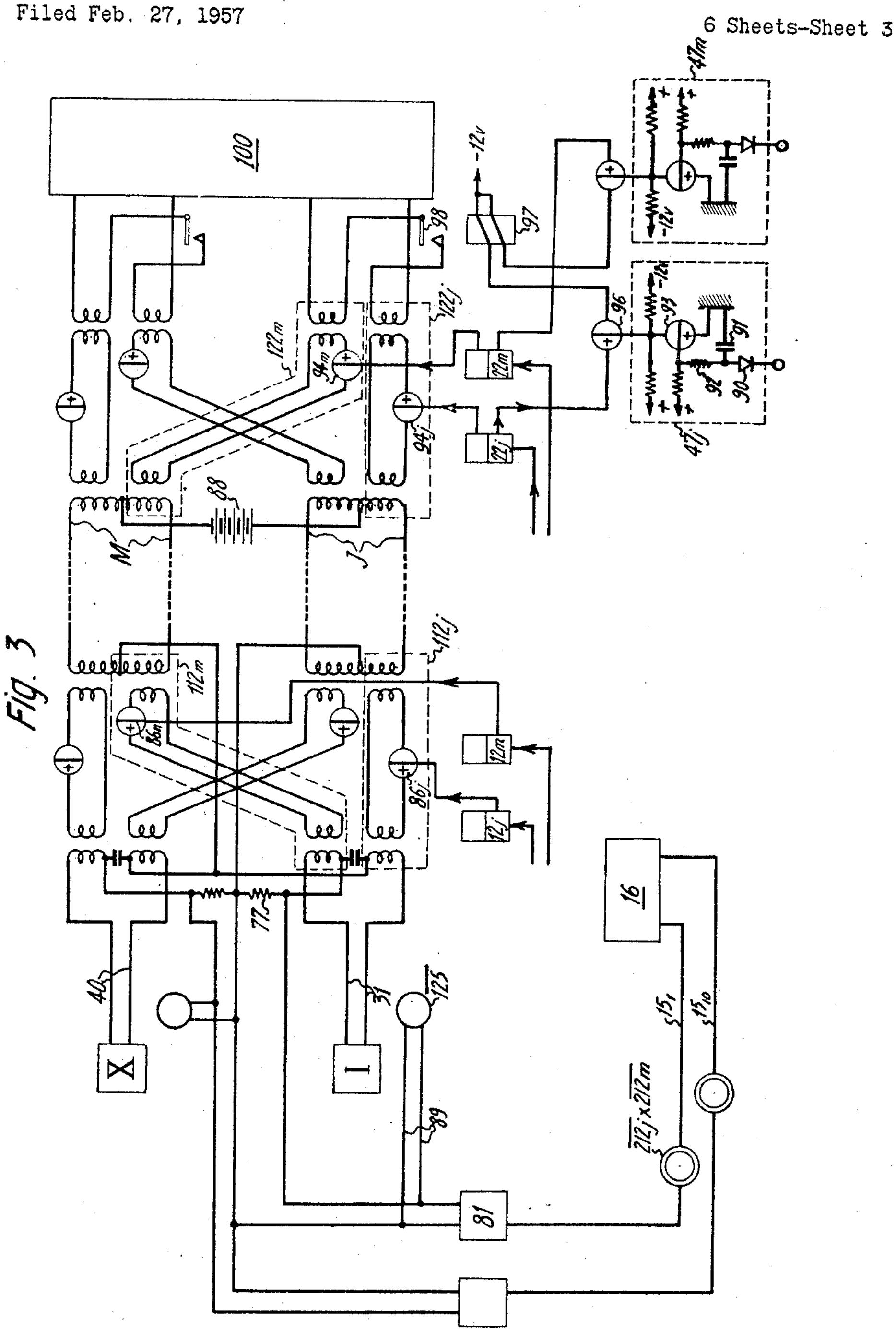
Fig. 3 is a diagram illustrating certain details of the subscriber's apparatus in the two concentrator devices of Figs. 1 and 2.

In Fig. 3 the subscriber I is connected to trunks J and M by transformers and transistors. The device indicated by dash line box 112_j_ (or in case of trunk M, the device 112_m_) comprising two transformer windings in series with the emitter-collector circuit of transistor 86_j_ constitutes a gate. Circuit 12_j_ (or 12_m_) polarizes the base of transistor 86_j_ (or 86_m_) in such a fashion that the gate 112_j_ (or 112_m_) will be closed when 12_j_ (or 12_m_) is at rest, and open when 12_j_ (or 12_m_ is energized.

122_j_ represents a combination of transformer windings and a transistor 94_j_ analogous to the combination 112_j_, but subject to control by circuit 22_j_.

This arrangement makes it possible to transmit the total power of the calling signals which amounts to some 500 milliwatts at 2000 ohms.

The supply current comes from a battery 88 located in the exchange-end concentrator, and is sent to the subscribers-end concentrator through the phantom circuit of trunks J and M. This current energizes the subscriber's stations through a circuit including a resistance such as 77. The potential difference across resistance 77 is zero so long as the subscriber's station is hung up, and during the dialing pulses. It has a specified other value, for example negative, when the subscriber's hand set is lifted and during the intervals between dialing pulses.

The potential difference across resistance 77 is applied to a differentiator 81 which provides pulses of one polarity upon lifting of the hand set and of the opposite polarity when the hand set is hung up. Negative pulses corresponding to lifting of the hand set and to interruptions of the loop circuit upon dialing are sent through lead $\mathbf{15}_1$ to coder 16 through the gate circuit $\overline{\mathbf{212}j}\times\overline{\mathbf{212}m}$.

This gate passes only the pulses occurring when the hand set is lifted since gate $\overline{\mathbf{212}j}\times\overline{\mathbf{212}m}$ closes as soon as either of circuits 12_j_ or 12_m_ is triggered, i.e., well before dialing begins. On the other hand, the voltage across resistance 77 is applied via lead 89 to gate $\overline{\mathbf{125}}$. This gate is hence open everytime that the subscriber's loop circuit is open whether his hand set is hung up or during the dial pulses of 66 milliseconds.

Explanation will now be given of how the subscriber's loop is retransmitted and how this loop is broken during dialing.

Figure 4:
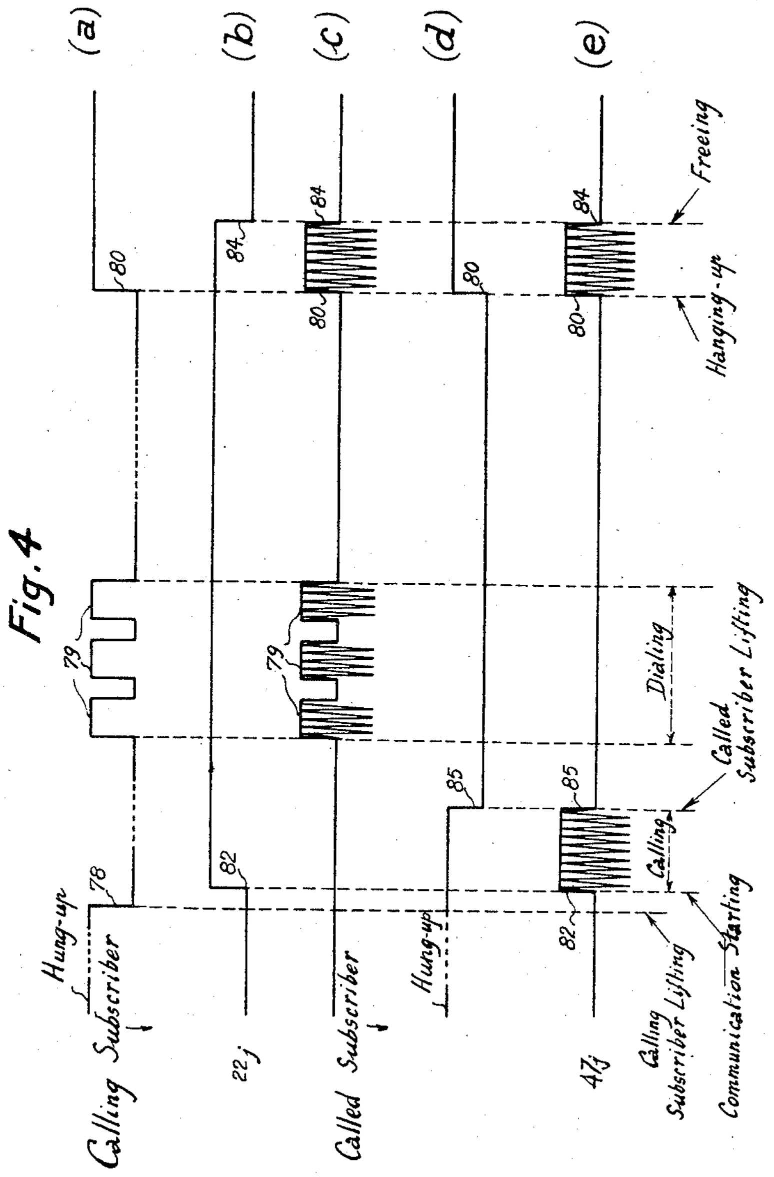
Fig. 4 is a diagram representing certain wave forms useful in explaining the operation of the apparatus in Fig. 3.

In Fig. 4 at wave form _a_, 78 represents lifting of the hand set by a calling subscriber. At 79 there are shown 3 dialing pulses each 66 milliseconds long separated by 33 millisecond intervals. The potential change at 80 represents hanging up by the subscriber.

In the same figure, at wave form _b_, 82 represents shift of circuit 22_j_ to energized condition. This indicates establishment of the communication circuit. This occurs a few instants after the calling subscriber lifts his hand set. At 84 there is indicated the return to rest condition of circuit 22*j*, at least 66 milliseconds after hanging up. 84 in wave form *b* thus indicates freeing of the circuit.

Wave form *c* indicates the energized phases of circuit 47*j*. Those identified by reference character 79 occur during dialing pulses and that between 80 and 84 occurs between hanging up and freeing of the circuit.

Wave form *d* shows at 85 the lifting of the handset by the called subscriber and, at 80 the hanging up.

Wave form *e* shows the energized periods of circuit 47*j* when one of subscribers I–X is called. Between times 82 and 85 this energized phase represents the calling process. Between times 80 and 84 it represents the interval between hanging up and freeing of the circuit.

It is evident from Fig. 4 that the subscriber's loop circuit must be completed in the exchange when simultaneously circuit 22*j* is energized and circuit 47*j* is at rest. Control of relay 97 which closes this loop must then be effected through a gate $322j \times \overline{147j}$. Naturally, for the sake of trunk M, this relay must also be controlled via a gate $332m \times \overline{147m}$.

Returning to Fig. 3, circuit 47*j* includes a rectifier 90, condenser 91, resistance 92 and transistor 93. The voltage at the collector of transistor 93 may, for example, be negative in the absence of signal and positive during the presence of signal of frequency $f_N$. This voltage is thus positive during the calling process, between hanging-up and freeing, or during the dialing pulses.

When circuit 22*j* is at rest, the voltage of the emitter of transistor 96 is minus 10 volts. Under these conditions relay 97 is not energized. When circuit 22*j* is triggered, the voltage of the emitter of transistor 96 is zero. Relay 97 is then energized and closes its contact, provided there is no signal of frequency $f_N$.

As soon as there is at the entrance to circuit 47*j* a signal of frequency $f_N$, the collector of transistor 93 and hence the base of transistor 96 becomes positive and transistor 96 is therefore cut off. Relay 97 is therefore no longer energized and its contact 98 opens.

There will now be described two types of decoding circuit which can be used for the circuits 29 of Fig. 1 and 23 of Fig. 2. The essential characteristics of these two types of decoders is their capacity to detect selectively signals of different frequencies which together make up a subscriber's identification signal, and to add these signals as detected at the input to a coincidence type gate which is so adjusted as to give an output signal when and only when two detected signals appear simultaneously at its input.

Figure 5:
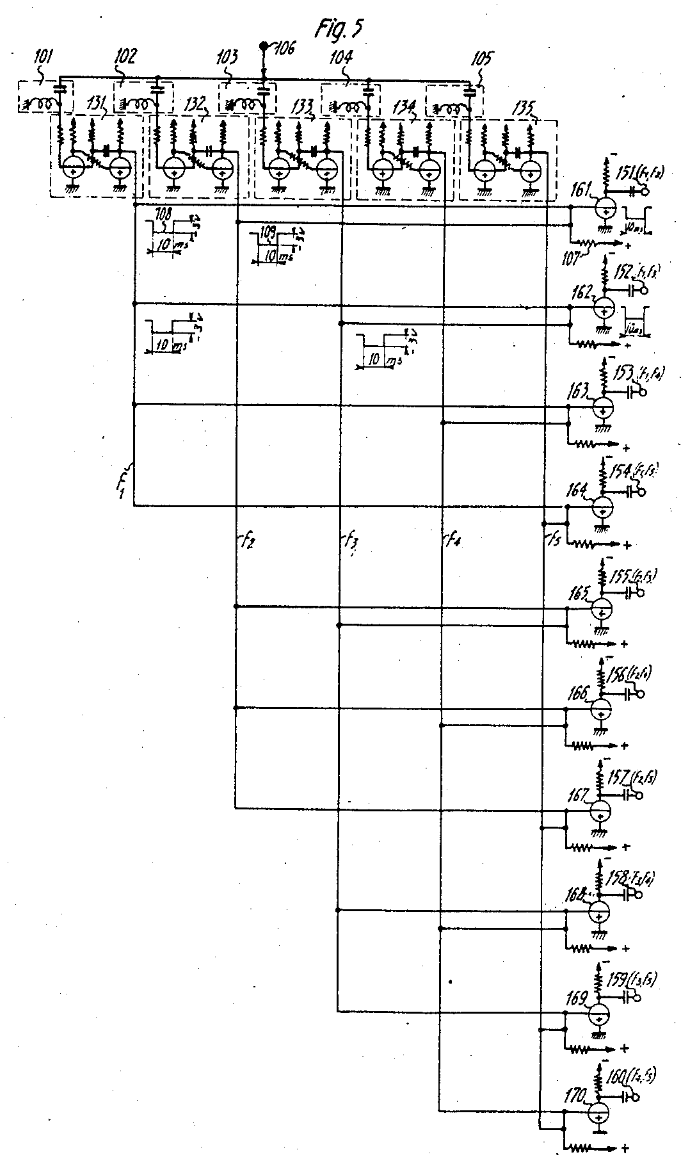
Figs. 5 and 6 are diagrams of two forms of decoding circuit which may be used in the concentrator of the invention.

In Fig. 5, 106 represents the input to a decoder of the first type and 151–160 represent the ten outputs therefrom. Input 106 is connected in parallel to 5 frequency selective circuits 101–105, shown here as comprising each an inductance and a condenser and tuned successively to the frequency $f_1$ to $f_5$. These frequency selective circuits are coupled to monstable trigger circuits 131–135 respectively, each of which comprises two transistors and a plurality of resistors. The outputs of circuits 131–135 are coupled in pairs to adding resistors as indicated at 107, and the signals, such as 108 and 109, added in pairs in these resistors are applied to the base of a plurality of transistors 161–170 whose emitters are at ground potential and whose collectors are connected to the separate outputs of the decoder circuit.

Figure 6:
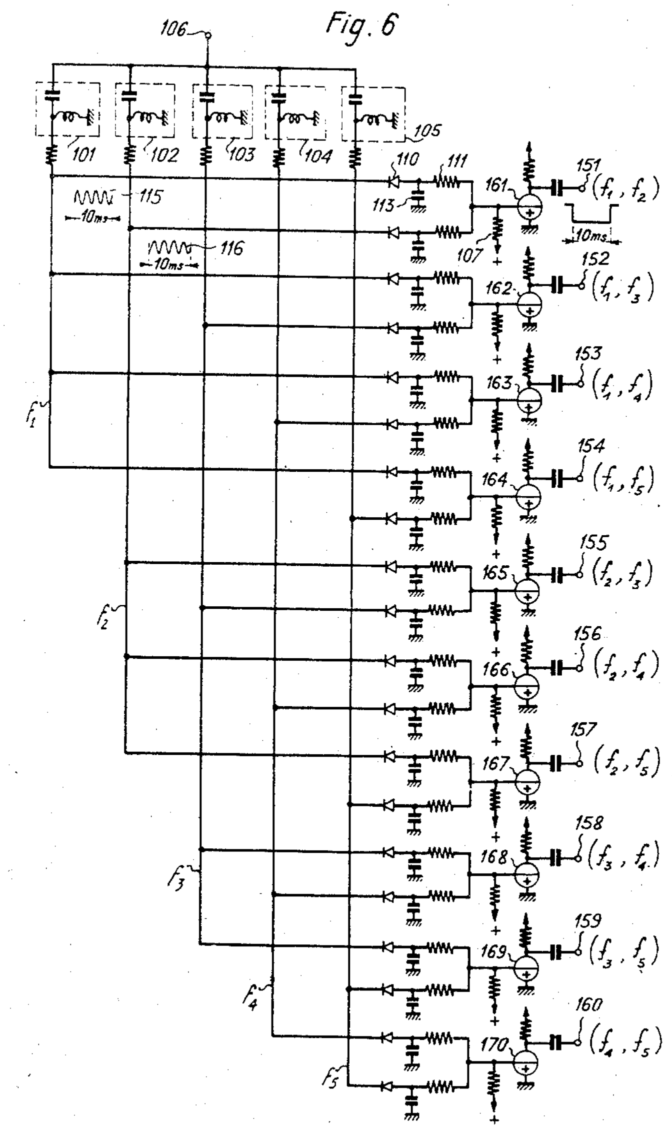

In Fig. 6, 106 represents again the input terminal but to a decoder of the second type. 151–160 are the ten outputs, 101–105 are the five frequency selective circuits and 161–170 are the ten transistors having their emitter electrodes at ground. The collector electrodes are connected to the output terminals of the decoder. At the base of these transistors there is effected addition in pairs after rectification of the plural frequency signals which make up the individual subscriber's identification signals.

A.C. signals such as 115 and 116 emerging from the frequency selective circuits 101–105 are detected each in a circuit comprising a rectifier 110 and a resistance-capacity circuit 111, 113. The detected signals are added in pairs in adding resistors 107, and the sum signals are applied to the base electrodes of transistors 161–170.

The electronic switch system of the invention has been described in terms of a number of preferred embodiments. Numerous variations are possible within the scope of the invention. Thus, for example, there have been described for the gates 112*j* and 112*m*, 122*j* and 122*m* of Fig. 3 circuits comprising two transformer windings and a transistor, designed to carry the total ringing power. The subscriber's stations may however include, instead of buzzers operating on power line frequency, loud speakers tuned to the trunk identification frequencies $f_j$ and $f_m$ or to any other frequency. These speakers may be replaced by means of earphones at the subscriber's stations. In the latter case the monostable trigger circuits 18*j* and 18*m* would be replaced by bi-stable trigger circuits triggered to energized condition by operation of the trunk designating trigger circuit 24*j* and 24*m* corresponding. Restoration to rest condition of such substituted bi-stable trigger circuits would be produced by the applicable circuit 47*j* or 47*m* as soon as it ceased to receive the dialing frequencies, i.e., upon lifting by the called subscriber of his hand set. The trunk designating frequency would thus serve as a calling signal, to be cut off when the called subscriber lifts his hand set. If the calling frequency is neither $f_j$ nor $f_m$, one might substitute a special bi-stable trigger circuit controlling a calling frequency generator.

While the invention has been described herein in terms of a number of preferred embodiments, numerous modifications and variations may be made therein without departing from the scope of the invention itself which is set forth in the appended claims.

We claim:

1. In telephony, a signalling system adapted to connect any one of a plurality of subscribers' stations with the corresponding subscriber's outgoing line of an automatic telephone exchange through any one of a lesser number of trunks, said system comprising a subscribers-end coder and de-coder adapted respectively to generate from a calling subscriber's hook-switch signal a plural frequency subscriber's identification signal and to generate a subscribers-end trunk access triggering signal from such identification signal, an exchange end coder and de-coder adapted respectively to generate a plural frequency subscriber's identification signal from an exchange outgoing line signal and to generate exchange-end trunk selecting signals from such identification signals, a trunk identification signal generator for each of said trunks operable in response to such trunk selecting signals, subscribers-end gate means for each of said stations and for each of said trunks adapted to couple such station to such trunk in response to the subscriber's identification signal and to the trunk selection signal for such trunk, and exchange-end gate means for each of said stations and for each of said trunks adapted to couple the exchange outgoing line of such station to such trunk in response to the subscriber's identification signal for such station and to the trunk identification signal for such trunk.

2. In a telephone system including a plurality of subscriber's stations each connected to a subscriber's line, a central office having an outgoing subscriber's line for each of said stations, and a lesser plurality of trunks, two-part concentrator apparatus having one part at each end of said trunks for connecting any of said stations to the corresponding one of said outgoing lines via one of said trunks, said apparatus comprising at each end of said trunks coding and decoding means respectively to apply to said trunks subscriber's identification signals and to select subscriber's lines from said last named signals, said apparatus further including at one end means responsive to the presence of a subscriber's identification signal on a trunk to apply to a free one of said trunks a trunk identification signal for selection thereof and for connection at that end of the selected trunk to the selected line and at the other end apparatus responsive to the presence of a trunk identification signal to connect the selected trunk to the selected line at the other end.

3. In a telephone system including a plurality of subscriber's stations each connected to a subscriber's line, a central office having an outgoing subscriber's line for each of said stations, and a lesser plurality of trunks, two-part concentrator apparatus having one part at each end of said trunks for connecting any of said stations to the corresponding one of said lines via one of said trunks, said apparatus including at each end of said trunks coding and decoding means respectively to apply a subscriber's identification signal to free ones of said trunks in response to energization of a subscriber's line at such end and to select the corresponding subscriber's line in response to last named signal, said apparatus further including at one end means responsive to the presence of a subscriber's identification signal on a trunk to apply to a free one of said trunks a trunk identification signal for selection thereof and to connect the selected trunk to the selected line at said one end, and means at the other end responsive to the presence of a trunk identification signal to connect the selected trunk to the selected line at said other end.

4. In a telephone system including a plurality of subscriber's stations and a central office having an outgoing subscriber's line for each of said stations, two-part concentrator apparatus comprising a first part remotely located from said central office and connected to each of said stations, a second part located in the vicinity of said central office and connected to each of said lines, a lesser plurality of trunks connecting said first part of said apparatus to said second part of said apparatus, means for connecting any of said stations to the corresponding one of said lines via one of said trunks by means of signals transmitted over said trunks exclusively, and means to communicate the identity of a subscriber's station over said trunks by means of alternating current signals of frequencies peculiar to such stations.

5. In a telephone system including a plurality of subscriber's stations and a central office having an outgoing subscriber's line for each of said stations; two-part concentrator apparatus comprising a first part remotely located from said central office and connected to each of said stations, a second part located in the vicinity of said central office and connected to each of said lines, a lesser plurality of trunks connecting said first part of said apparatus to said second part of said apparatus, means for connecting any of said stations to the corresponding one of said lines via one of said trunks by means of signals transmitted over said trunks exclusively, means to communicate the identity of a subscriber's station over said trunks by means of alternating current signals of frequencies peculiar to such station, means in said second part to select a trunk in response to the appearance of one of said alternating current signals, and means in said second part to communicate the identity of the selected trunk to said first part by means of an alternating current trunk identification signal applied to such trunk.

References Cited in the file of this patent

UNITED STATES PATENTS

| | | |
|---|---|---|
| 2,715,656 | Andrews | Aug. 16, 1955 |
| 2,724,744 | Brewer et al. | Nov. 22, 1955 |
| 2,774,822 | Dunlap et al. | Dec. 18, 1956 |
| 2,783,306 | Lesigne | Feb. 26, 1957 |
| 2,787,667 | Mauge | Apr. 22, 1957 |
| 2,812,385 | Joel et al. | Nov. 5, 1957 |
| 2,820,103 | Abbott | Jan. 14, 1958 |

UNITED STATES PATENT OFFICE

CERTIFICATE OF CORRECTION

Patent No. 2,951,907 September 6, 1960

Charles C. Marzin et al.

It is hereby certified that error appears in the printed specification of the above numbered patent requiring correction and that the said Letters Patent should read as corrected below.

Column 6, line 73, before "trunk" strike out "line"; column 8, line 31, for "(or 12m" read -- (or 12m) --; column 9, line 24, for "332m" read -- 322m --; column 10, line 61, for "subscriber's identification" read -- trunk access triggering --.

Signed and sealed this 4th day of April 1961.

(SEAL)

Attest: ERNEST W. SWIDER

~~KARL H. AXLINE~~ XXXXXXXXX

Attesting Officer

ARTHUR W. CROCKER

Acting Commissioner of Patents